US012547734B2

(12) United States Patent
Parla et al.

(10) Patent No.: US 12,547,734 B2
(45) Date of Patent: Feb. 10, 2026

(54) TECHNOLOGY FOR PHISHING AWARENESS AND PHISHING DETECTION

(71) Applicant: Cisco Technology, Inc., San Jose, CA (US)

(72) Inventors: Vincent Parla, North Hampton, NH (US); Hugo Mike Latapie, Long Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 18/622,874

(22) Filed: Mar. 30, 2024

(65) Prior Publication Data

US 2024/0333750 A1    Oct. 3, 2024

Related U.S. Application Data

(60) Provisional application No. 63/493,552, filed on Mar. 31, 2023.

(51) Int. Cl.
| | |
|---|---|
| *G06F 21/00* | (2013.01) |
| *G06F 21/56* | (2013.01) |
| *G06F 21/57* | (2013.01) |
| *G06N 20/00* | (2019.01) |
| *H04L 9/40* | (2022.01) |

(52) U.S. Cl.
CPC .......... *G06F 21/577* (2013.01); *G06F 21/566* (2013.01); *G06N 20/00* (2019.01); *H04L 63/1425* (2013.01); *H04L 63/1433* (2013.01); *H04L 63/1483* (2013.01)

(58) Field of Classification Search
None
See application file for complete search history.

(56) References Cited

U.S. PATENT DOCUMENTS

| | | |
|---|---|---|
| 2017/0237776 A1 | 8/2017 | Higbee et al. |
| 2021/0365866 A1* | 11/2021 | Kras ..................... G06F 21/552 |
| 2021/0390181 A1 | 12/2021 | McClay |
| 2023/0016110 A1 | 1/2023 | Grealish |
| 2023/0136989 A1* | 5/2023 | Irimie ................. H04L 63/1433 |
| | | 726/25 |

* cited by examiner

*Primary Examiner* — Andrew J Steinle
(74) *Attorney, Agent, or Firm* — Polsinelli P.C.

(57) ABSTRACT

The present disclosure is directed to training email users to enhance awareness of attempted spear phishing by attackers observing user actions to build a model of user susceptibilities using a trained LLM. A service in an intrusion prevention system can receive from one or more accounts linked to an enterprise and provide a message, along with a prompt to the LLM, stimulating the generation of one or more variants of the received messages that exhibit similar content characteristics. The LLM can produce a set of variant messages encompassing these content characteristics, purposefully including one or more phishing traits identified during training with the prelabeled dataset. These variant messages are then transmitted to the relevant accounts to assess interactions with the set. Based on the interactions observed across the accounts, an interaction score is generated to evaluate the efficacy of the user's training to avoid phishing attempts within the enterprise environment.

20 Claims, 10 Drawing Sheets

TECHNOLOGY FOR PHISHING AWARENESS AND PHISHING DETECTION

CROSS-REFERENCE TO RELATED APPLICATIONS

This application claims priority to U.S. provisional application No. 63/493,552, filed on Mar. 31, 2023, which is expressly incorporated by reference herein in its entirety.

FIELD OF TECHNOLOGY

The field of technology for this patent application relates to cybersecurity tools for the detection of behavioral characteristics associated with cybersecurity attacks. Specifically, the proposed technology is directed towards training email users to have an awareness of spear phishing by observing user actions to build a model of user susceptibilities, where the model can be fed into a large language model (LLM) to create spear phishing attacks particular to the respective users.

BACKGROUND

An increase in malicious attacks on networks gives rise to various challenges to ensure secure and effective communication between devices in a network. With increasing numbers of devices and access points on the network, comprehensive security strategies benefit from defenses at multiple layers of depth, with security layered across the network, the server, and the endpoints. Intrusion prevention systems can monitor a network for malicious or unwanted activity, as well as end-user actions that can be particularly vulnerable to spear phishing campaigns, which can have significant repercussions for enterprise network security. Compromised end-user accounts can serve as footholds for further infiltration, enabling attackers to escalate their activities within an enterprise network.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
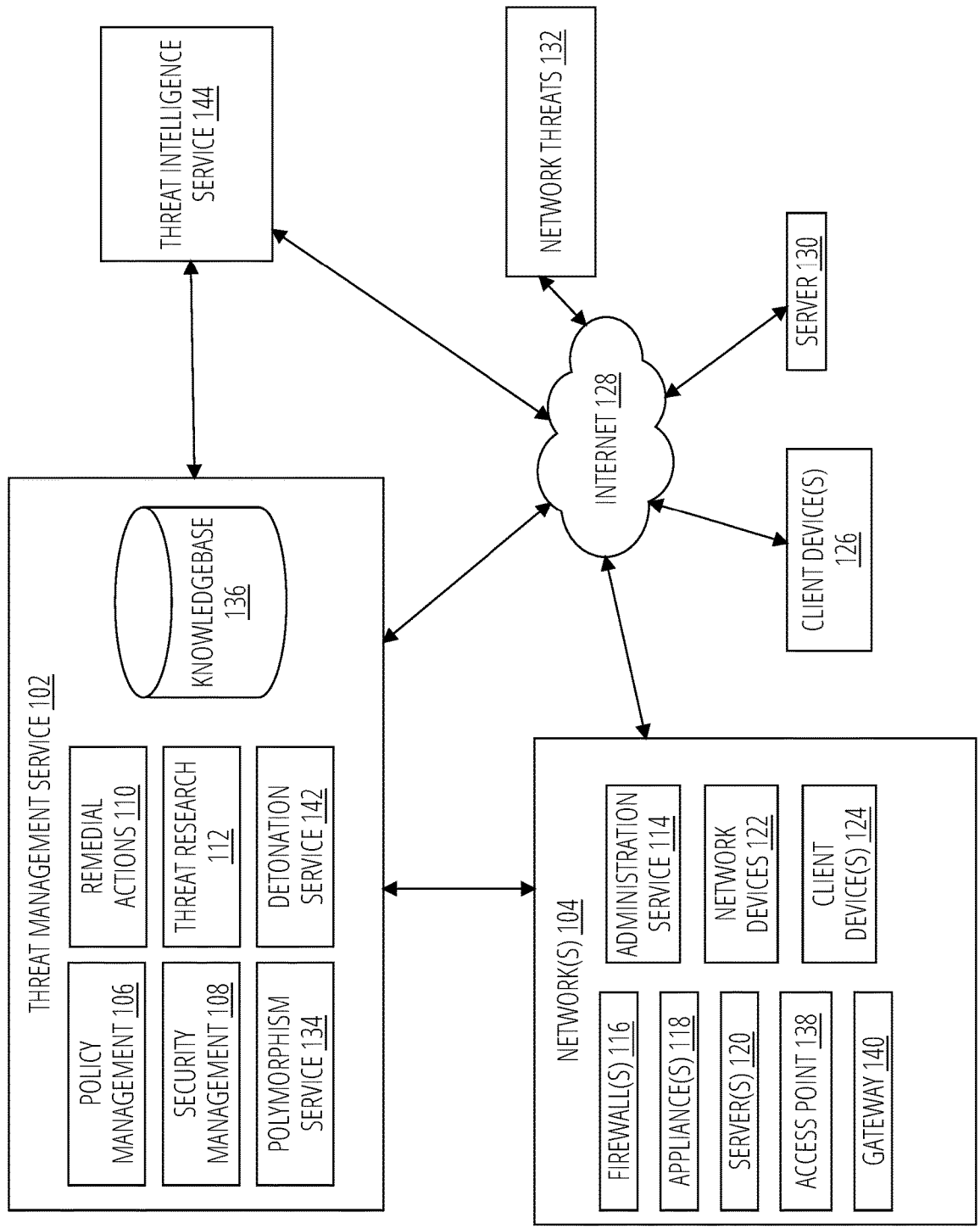
FIG. 1 illustrates an example threat management system in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure may be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or may be learned by practice of the herein disclosed principles. The features and advantages of the disclosure may be realized and obtained by means of the instruments and combinations particularly pointed out in the appended claims. These and other features of the disclosure will become more fully apparent from the following description and appended claims, or may be learned by the practice of the principles set forth herein.

Overview

Generative LLMs can be important tools for preventing malware infections, spear phishing campaigns, and performing threat management.

The present disclosure is directed toward providing training to users to recognize and combat spear phishing received via email, utilizing observed user behaviors when interacting with emails in their email accounts to develop a susceptibility model. This model is then integrated into LLMs to generate tailored spear phishing simulations for individual users. The implementation of such targeted training enhances user awareness, thereby strengthening the overall intrusion prevention strategy for enterprises. By equipping users with the skills to identify and mitigate phishing threats, organizations can bolster their defenses against malicious intrusions, safeguarding sensitive data and network integrity more effectively.

In one aspect, the techniques described herein pertain to a method encompassing various stages. Initially, the method involves training an LLM with a prelabeled dataset of example phishing messages. The LLM is specifically configured to recognize one or more phishing messages based on the prelabeled dataset. Subsequently, messages are received from one or more accounts affiliated with an enterprise. Following this, a message containing a prompt is provided to the LLM, prompting it to generate one or more variants of the received messages with similar content characteristics. Upon receiving these variant messages from the LLM, the set is analyzed to include one or more phishing characteristics identified during the training process with the prelabeled dataset. These variant messages are then transmitted to the respective accounts, where interactions with at least one of the variant messages are identified. An interaction score is generated based on the interactions observed by the one or more accounts.

The method may also include where training the LLM includes providing to the LLM the prelabeled dataset of phishing messages, sending a first request to the LLM to identify the one or more phishing messages in a first set of training messages, receiving an output from the LLM identifying the one or more phishing messages in the first set of training messages as including phishing, and providing a set of feedback to the LLM including an accuracy level of the output.

The method may also include further includes determining that the interaction score for a first account is above a predetermined threshold and identifying that the first account has received a satisfactory result based on the one or more interactions with the set of variant messages, the satisfactory result indicating that the first account has completed at least one category of phishing training.

The method may also include where the satisfactory result indicates one or more of a completion of training for the first account or an additional category of phishing training to prompt the LLM to generate additional variants of the received messages related to the first account.

The method may also include further includes determining that the interaction score for a first account is below a predetermined threshold, identifying that the first account has received a non-satisfactory result based on the one or more interactions with the set of variant messages, the non-satisfactory result indicating that the first account has not completed an assigned category of phishing training, identifying at least one of the interactions related to the first account that interacted with a phishing message, providing to the LLM a second request including a second prelabeled dataset of phishing examples related to the phishing message, receiving a second output from the LLM identifying additional example emails based on the second prelabeled dataset, and transmitting to the first account the additional example emails to retrain the first account.

The method may also include where the prompt to the LLM further includes prompting the LLM to create the one or more variants of the received messages that include content characteristics including variant hyperlinks, domain names, and homoglyphic characters, the variant messages being generated based on the prelabeled dataset and configured to mimic the content characteristics observed in known phishing messages and the received messages from the one or more accounts.

The method may also include where the interaction score is generated by collecting the one or more interactions with the set of variant messages by the one or more accounts in a database, analyzing the one or more interactions to identify patterns in the interactions associated with known vulnerabilities to phishing attempts, and applying a score based on at least one user accounts susceptibility to the known vulnerabilities indicated by the one or more interactions.

In one aspect, the techniques described herein relate to a network device that includes one or more memories having computer-readable instructions stored therein. The network device also includes one or more processors configured to execute the computer-readable instructions to train an LLM with a prelabeled dataset of example phishing messages, the LLM being configured to identify one or more phishing messages based on the prelabeled dataset, receive messages from one or more accounts associated with an enterprise, provide a message with a prompt to the LLM, the message prompting the LLM to create one or more variants of the received messages that includes similar content characteristics, receive from the LLM a set of variant messages including the content characteristics, the set of variant messages generated to include one or more phishing characteristics identified during training with the prelabeled dataset, transmit the set of variant messages to the accounts to identify one or more interactions with at least one of the set of variant messages, and generate an interaction score based on the one or more interactions by the one or more accounts.

In one aspect, the techniques described herein relate to a non-transitory computer-readable storage medium includes computer-readable instructions, which when executed by one or more processors of a network appliance, cause the network appliance to train an LLM with a prelabeled dataset of example phishing messages, the LLM being configured to identify one or more phishing messages based on the prelabeled dataset, receive messages from one or more accounts associated with an enterprise, provide a message with a prompt to the LLM, the message prompting the LLM to create one or more variants of the received messages that includes similar content characteristics, receive from the LLM a set of variant messages including the content characteristics, the set of variant messages generated to include one or more phishing characteristics identified during training with the prelabeled dataset, transmit the set of variant messages to the accounts to identify one or more interactions with at least one of the set of variant messages, and generate an interaction score based on the one or more interactions by the one or more accounts.

The following description is directed to certain implementations for the purposes of describing innovative aspects of this disclosure. However, a person having ordinary skill in the art will readily recognize that the teachings herein can be applied in a multitude of different ways.

Example Embodiments

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Cybersecurity is becoming increasingly important in today's digital world. With the rise of new technologies and compliance requirements, organizations must stay vigilant to protect themselves against evolving cyber threats. However, traditional security measures are often not enough to keep up with the pace of these threats. This is why it is essential for organizations to identify and address vulnerabilities before malicious actors can exploit them. By taking proactive measures to secure their systems, organizations can ensure that they are protected against cyber attacks and can continue to operate safely and securely in the digital landscape.

In the realm of cybersecurity, identifying potential network threats and attackers has become increasingly intricate and challenging. This complexity arises from several factors, including the evolving tactics employed by malicious actors, as well as the growing attack surface created by expanding digital interactions and the use of advanced technologies.

One increasingly notable trend is the use of spear phishing to target specific users associated with an enterprise network. Spear phishing involves targeted emails or messages that appear legitimate, often impersonating trusted individuals or organizations, to trick recipients into revealing sensitive information or performing actions that compromise security. If successful, these campaigns can grant attackers unauthorized access to the network. Attackers use spear phishing tactics to deceive targeted individuals or organizations into divulging valuable information or performing actions that compromise security, such as login credentials, financial data, intellectual property, or other confidential information. They may also seek access to corporate networks, systems, or infrastructure for various malicious purposes, including data theft, espionage, sabotage, or financial fraud. Additionally, attackers may use spear phishing to deploy malware, ransomware, or other malicious software payloads onto targeted systems, allowing them to exploit vulnerabilities, disrupt operations, or extort ransom payments.

To address this challenge, the disclosed technology provides an advanced training system that utilizes an LLM to create targeted campaigns that assist with training users to avoid phishing attacks. To improve intrusion prevention systems against spear phishing attacks, the disclosed technology utilizes a training service or another component within the prevention system. This component is responsible for providing a labeled dataset to a machine learning model during a training phase. This dataset encompasses a diverse range of examples of emails, each labeled as either indicative of phishing or not. Optionally, the dataset may also include labels identifying specific phishing techniques exhibited within the phishing examples.

The LLM is iteratively trained to discern patterns indicative of phishing within the dataset. A reward function reinforces the model's correct classifications of emails as phishing or not and potentially identifies the specific phishing techniques employed. This iterative process enables the LLM to develop a nuanced understanding of various phishing tactics.

Subsequently, the LLM undergoes training to generate phishing emails autonomously, either from scratch or by utilizing an email provided as part of a prompt to introduce variability. The training involves prompting the LLM to generate a phishing email, followed by an evaluation of the output. This evaluation may entail manual assessment by human evaluators or employing the same LLM to analyze the generated email's phishing attributes, leveraging its prior training in phishing detection.

Feedback loops are established to refine the LLM's phishing email generation capabilities iteratively. By systematically providing feedback on the quality of generated phishing emails, the model learns to adjust its outputs, gradually improving its proficiency in generating convincing phishing emails.

The feedback provided by services within the intrusion prevention system to the LLM can stem from the access to messages within individual user accounts. The services can monitor the user accounts to determine the type of messages various users are receiving. The monitoring can further be performed to determine.

The monitoring can further be performed to determine various aspects such as senders and topics of emails, aiding in the identification of potential phishing attempts. Additionally, the services can facilitate the detection of instances where users have inadvertently fallen for phishing attacks, enabling targeted remedial actions and user education efforts. Furthermore, the monitoring process can identify specific messages suitable for use as examples in training the LLM to generate phishing emails, thereby enhancing the model's capability to simulate and anticipate phishing threats effectively.

Once the LLM has been trained, the training service or another service within the intrusion prevention system can use the trained LLM to create phishing examples targeted at the particular user in order to train the user. The creation of phishing examples entails several approaches designed to train the LLM to generate convincing phishing emails.

One method involves supplying selected messages to the LLM alongside prompts instructing it to produce phishing variants of those emails. Through previous training, the LLM has acquired the ability to generate modified versions of these messages that mimic the characteristics of legitimate emails, thereby simulating user interaction patterns observed with non-phishing messages.

Alternatively, the training service can issue prompts directly to the LLM, instructing it to generate phishing messages without the need for specific example emails. For instance, prompts may include instructions like "Create a phishing email from Mary Smith, discussing the ACME deal that is closing tomorrow" or "Generate a phishing email from Mary Smith utilizing homoglyphic characters, known as 'confusables', as the phishing technique." These prompts guide the LLM in crafting tailored phishing messages tailored to specific scenarios or utilizing predefined phishing techniques.

In some examples, the LLM has the capability to automate the generation of domain names and links that closely resemble those with which a user typically interacts. Through subtle alterations such as transposing letters, these generated domains, and links mimic legitimate ones, increasing the likelihood of users overlooking the subtle discrepancies.

After generating phishing emails, the LLM forwards them to the training service, which subsequently distributes them across various user accounts within the network. The training service monitors user interactions with the emails, allowing for the assessment of user susceptibility to phishing attempts. By analyzing user responses, the training service can refine the LLM's capabilities, iteratively enhancing its proficiency in generating realistic phishing examples and simulating user engagement patterns.

To enhance phishing resilience and training effectiveness, an interaction score is derived from user interactions with phishing emails. Concurrently, a comprehensive database of phishing examples is compiled, including details such as phishing techniques, user responses (ignoring, falling for, reporting), and records of wild-type phishing emails captured by filters or reported by users. This database can serve as a foundational resource for generating interaction scores and conducting further analysis to discern user training trends, vulnerabilities to specific techniques, and evolving phishing tactics employed by attackers.

The interaction score further provides a metric for determining the need for additional training for users in the enterprise. Further, the interaction score enables targeted intervention, whether for individual users, specific groups (e.g., roles, teams, departments), or the entire enterprise. If the interaction score surpasses a predefined threshold, it signifies successful phishing training, potentially allowing users to progress training in other areas. Conversely, scores below the threshold indicate a requirement for further training.

When additional training is deemed necessary, based on the threshold, the training service identifies the underlying factors contributing to the low score. Subsequently, it instructs the LLM to produce customized training materials and generate supplementary variants of messages tailored to address the specific needs of users requiring targeted intervention. These training materials and variant emails aim to address specific weaknesses or areas of vulnerability observed in user interactions with phishing emails, fostering improved resilience and response capabilities.

While individualized training remains paramount, broader trends are also discerned at scale. Leveraging insights from aggregated data, the LLM generates examples to counteract emerging trends in phishing tactics, bolstering enterprise-wide defenses against evolving threats.

Accordingly, the proposed technology provides an objective to develop highly focused campaigns aimed at empowering users to go beyond merely evading phishing attempts. Through effective phishing training scenarios, users can gain insights into the complexities involved in dealing with real-life phishing attacks. The training will help users navigate such situations effectively, thereby reducing the risk of negative consequences for the enterprise. Moreover, it will equip users with the necessary skills to handle phishing threats more efficiently in practical settings.

FIG. 1 illustrates an environment for threat management. Specifically, FIG. 1 depicts a block diagram of a threat management service 102 providing protection to one or more enterprises, networks, locations, users, businesses, etc., against a variety of threats. The threat management service 102 may be used to protect devices (e.g., IoT devices, appliances, services, client devices, or other devices) from computer-generated and human-generated threats.

The threat management service 102 is a malware analysis platform that discovers, identifies, analyzes, and tracks sophisticated threats. It provides an end-to-end workflow from intelligence gathering to multi-vector analysis, threat hunting, and response, resulting in real-time visibility into malicious behavior associated with known and unknown malware.

The threat management service 102 can perform dynamic sandboxing of suspicious files, control flow graph analysis, and memory scanning to detect malicious activity. It can also accelerate the hunting and finding of threats by providing context for suspicious files, including the behavior of known threats tracked across various networks, to identify associated malware campaigns.

In order to track threats, the threat management service 102 uses a combination of static analysis to examine code and look for telltale indicators that can indicate the presence of malicious code. As well as dynamic analysis to examine how the code behaves when it is executed. This allows the threat management service 102 to accurately identify samples of malware even if they are changed in form but not in function or modified to be difficult for humans or computers to understand (obfuscated).

As explained herein the threat management service 102 further uses detection of both Signature characterization and Behavioral characterizations to identify code as malicious or malware. Signature characterization detection works by scanning for known malware, relying on a database of known threats worldwide and their signatures. Behavioral characterization detection looks at how the code behaves when executed, allowing the threat management service 102 to detect unknown or newly created malware.

During detection, the threat management service 102 will look at the code, metadata, download history, and other information associated with the threat to determine whether or not it is malicious. If it is determined that the code is malicious, then the threat management service 102 will create a report that includes detailed information about the threat, such as its origin, type, risk level, and other related characteristics. Additionally, the report may contain indicators that can help identify the malware's spreading patterns and networks used to host the malicious content. The report can further provide any associated user actions or events occurring before the system detected the threat.

The report and analysis in threat management service 102 can further produce a variety of malware resolutions and solutions, such as blocking malicious URLs, killing malicious processes, quarantining affected files and systems, and disabling malicious services. Additionally, it can provide suggestions on how to improve an organization's security posture or alert administrators to new threats that they should be aware of.

The threat of malware or other compromises may be present at various points within a network 104 such as client devices 124, server 120, gateways 140, IoT devices, appliances 118, firewalls 116, etc. In addition to controlling or stopping malicious code, the threat management service 102 may provide policy management to control devices, applications, or user accounts that might otherwise undermine the productivity and network performance within the network 104.

The threat management service 102 may provide protection to network 104 from computer-based malware, including viruses, spyware, adware, trojans, intrusion, spam, policy abuse, advanced persistent threats, uncontrolled access, and the like. In general, the network 104 may be any networked computer-based infrastructure or the like managed by the threat management service 102, such as an organization, association, institution, or the like, or a cloud-based service. For example, the network 104 may be a corporate, commercial, educational, governmental, or other network, and may include multiple networks, computing resources, and other facilities, may be distributed among more than one geographical locations, and may include an administration service 114, a firewall 116, an appliance 118, a server 120, network devices 122 including access point 138 and a gateway 140, and endpoint devices such as client devices 124 or IoT devices.

The threat management service 102 may include computers, software, or other computing service supporting a plurality of functions, such as one or more of a security management service 108, a policy management service 106, a remedial action service 110, a threat research service 112, and the like. In some embodiments, the threat protection provided by the threat management service 102 may extend beyond the network boundaries of the network 104 to include client devices 124 that have moved into network connectivity not directly associated with or controlled by the network 104. Threats to client facilities may come from a variety of sources, such as network threats 132, physical proximity threats, and the like. Client device 124 may be protected from threats even when the client device 124 is not directly connected to or in association with the network 104, such as when a client device 124 moves in and out of the network 104, for example, when interfacing with an unprotected server 120 through the internet 128.

The threat management service 102 may use or may be included in an integrated system approach to provide the network 104 with protection from a plurality of threats to device resources in a plurality of locations and network configurations. The threat management service 102 may also or instead be deployed as a stand-alone solution for an enterprise. For example, some or all of the threat management service 102 components may be integrated into a server or servers on-premises or at a remote location, for example, in a cloud computing service. For example, some or all of the threat management service 102 components may be integrated into a server 120, firewall 116, gateway 140, appliance 118, or access point 138 within or at the border of the network 104. In some embodiments, the threat management service 102 may be integrated into a product, such as a third-party product (e.g., through an application programming interface), which may be deployed on endpoints, on remote servers, on internal servers or gateways for a network, or some combination of these.

The security management service 108 may include a plurality of elements that provide protection from malware to device resources of the network 104 in a variety of ways, including endpoint security and control, email security and control, web security and control, reputation-based filtering, control of unauthorized users, control of guest and non-compliant computers, and the like. The security management service 108 may also provide protection to one or more device resources of the network 104. The security management service 108 may have the ability to scan client service files for malicious code, remove or quarantine certain applications and files, prevent certain actions, perform remedial actions, and perform other security measures. This may include scanning some or all of the files stored on the client service or accessed by the client service on a periodic basis, scanning an application when the application is executed, scanning data (e.g., files or other communication) in transit to or from a device, etc. The scanning of applications and files may be performed to detect known or unknown malicious code or unwanted applications.

The security management service 108 may provide email security and control. The security management service 108 may also or instead provide for web security and control, such as by helping to detect or block viruses, spyware, malware, unwanted applications, and the like, or by helping to control web browsing activity originating from client devices. In some embodiments, the security management service 108 may provide network access control, which may provide control over network connections. In addition, network access control may control access to virtual private networks (VPN) that provide communications networks tunneled through other networks. The security management service 108 may provide host intrusion prevention through behavioral-based analysis of code, which may guard against known or unknown threats by analyzing behavior before or while code executes. Further, or instead, the security management service 108 may provide reputation filtering, which may target or identify sources of code.

In general, the security management service 108 may support overall security of the network 104 using the various techniques described herein, optionally as supplemented by updates of malicious code information and so forth for distribution across the network 104. Information from the security management service 108 may also be sent from the enterprise back to a third party, a vendor, or the like, which may lead to improved performance of the threat management service 102. For example, threat intelligence service 144 can receive information about newly detected threats from sources in addition to the threat management service 102 and can provide intelligence on new and evolving threats.

The policy management service 106 of the threat management service 102 may be configured to take actions, such as to block applications, users, communications, devices, and so on based on determinations made. The policy management service 106 may employ a set of rules or policies that determine network 104 access permissions for one or more of the client devices 124. In some embodiments, a policy database may include a block list, a blacklist, an allowed list, a whitelist, or the like, or combinations of the foregoing, which may provide a list of resources internal or external to the network 104 that may or may not be accessed by the client devices 124. The policy management service 106 may also or instead include rule-based filtering of access requests or resource requests, or other suitable techniques for controlling access to resources consistent with a corresponding policy.

As threats are identified and characterized, the threat research service 112 may create updates that may be used to allow the threat management service 102 to detect and remediate malicious software, unwanted applications, configuration and policy changes, and the like. The threat research service 112 may contain threat identification updates, also referred to as definition files and can store these definition files in the knowledgebase 136. A definition file may be a virus identity file that may include definitions of known or potential malicious code. The virus identity definition files may provide information that may identify malicious code within files, applications, or the like. In some embodiments, the definition files can include hash values that can be used to compare potential malicious code against known malicious code. In some embodiments, the definition files can include behavior characterizations, such as graphs of malware behavior. In some embodiments, the threat research service 112 can detonate possible malware to create the behavioral characterizes to be included in the definition files.

The definition files may be accessed by the security management service 108 when scanning files or applications within the client service for the determination of malicious code that may be within the file or application. The definition files include a definition for a neural network or other recognition engine to recognize malware. The threat research service 112 may provide timely updates of definition files information to the knowledgebase 136, network 104, and the like.

In some embodiments, in addition to characterizing detected and known malware in the definition files, the threat research service 112 can utilize a polymorphism service 134 to attempt to improve the ability to recognize polymorphic variants of detected malware. In some embodiments, the polymorphism service 134 can make use of a Generative large language model to create polymorphic variants of malware and determine if the polymorphic variants are detected by the security management service 108. When a polymorphic variant is not detected, the polymorphic variant can be detonated using detonation service 142. The threat research service 112 can store a hash value and any updates to the behavioral characterizations as part of the definitions files to ensure that the polymorphic variant of the malware will be detected if it is ever encountered.

The security management service 108 may be used to scan an outgoing file and verify that the outgoing file is permitted to be transmitted per rules and policies of the network 104. By checking outgoing files, the security management service 108 may be able to discover malicious code infected files that were not detected as incoming files. Additionally, the security management service 108 can generate outgoing files for data loss prevention against data loss prevention policies configured by the policy management service 106.

When a threat or policy violation is detected by the threat management service 102, the threat management service 102 may perform or initiate remedial action through the remedial action service 110. Remedial action may take a variety of forms, such as terminating or modifying an ongoing process or interaction, issuing an alert, sending a warning (e.g., to a client device 124 or to the administration service 114) of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on one or more of the client devices client device 124, quarantining a related application (or files, processes or the like), terminating the application or device, isolating the application or device, moving a process or application code to a sandbox for evaluation by the detonation service 142, isolating one or more of the client devices 124 to a location or status within the network that restricts network access, blocking a network access port from one or more of the client device 124, reporting the application to the administration service 114, or the like, as well as any combination of the foregoing.

In some embodiments, the threat intelligence service 144 offers intelligence on the latest threats and solutions for prevention. For example, the threat intelligence service 144 provides instructional data to all security devices such as threat management service 102 and provides information to create definition files to identify the latest threat to protect the network from newly detected attacks. The main advantage of the threat intelligence service 144 is the large amount of security network devices that can provide threat intelligence service 144 with data on detected and undetected threats. There can be many security devices across many different networks, enterprises, and vendors that can feed information to the threat intelligence service 144, and therefore threat intelligence service 144 has more data on threats than the threat management service 102. The threat intelligence service 144 collects data from many devices and adds to it all the data collected by partners to analyze vectors of new attacks. The threats are tracked using digital signatures that can be used in the definition files used by the threat management service 102.

One type of signature is a Hash-Based signatures. These hashes are generated through dynamic sandboxing, control flow graph analysis, memory scanning, behavior-based detection, and other methods for identifying malicious code. The threat intelligence service 144 can then provide detailed reports with threat indicators that can help administrators track down malicious code and reduce their risk of infection.

Another type of signature is a Pattern Based Signatures or BASS (Automated Signature Synthesizer). BASS (Automated Signature Synthesizer) is a framework designed to automatically generate antivirus signatures from samples belonging to previously generated malware clusters. It is meant to reduce resource usage by producing more pattern-based signatures as opposed to hash-based signatures. Compared to pattern-based or bytecode-based signatures, hash-based signatures have the disadvantage of only matching a single file per signature. Pattern-based signatures are able to identify a whole cluster of files instead of just a single file.

The threat management service 102 may provide threat protection across the network 104 to devices such as the client devices 124, the servers 120, the administration service 114, the firewall 116, the access point 138, the gateway 140, one or more of the network devices 122 (e.g., hubs and routers), one or more of the appliances 118 (e.g., a threat management appliance), any number of desktop or mobile users, and the like in coordination with an endpoint computer security service. The endpoint computer security service may be an application locally loaded onto any device or computer support component on network 104, either for local security functions or for management by the threat management service 102 or other remote resource, or any combination of these.

The network 104 may include one or more of the servers 120, such as application servers, communications servers, file servers, database servers, proxy servers, mail servers, fax servers, game servers, web servers, and the like. In some embodiments, the threat management service 102 may provide threat protection to servers 120 within the network 104 as load conditions and application changes are made.

The client devices 124 may be protected from threats from within the network 104 using a local or personal firewall, which may be a hardware firewall, software firewall, or a combination thereof, that controls network traffic to and from a client. The local firewall may permit or deny communications based on a security policy.

The interface between the threat management service 102 and the network 104 to embedded endpoint computer security facilities, may include a set of tools that may be the same or different for various implementations and may allow network administrators to implement custom controls. In some embodiments, these controls may include both automatic actions and managed actions. The administration service 114 may configure policy rules that determine interactions.

Interactions between the threat management service 102 and the components of the network 104, including mobile client service extensions of the network 104, may ultimately be connected through the internet 128 or any other network or combination of networks. Security-related or policy-related downloads and upgrades to the network 104 may be passed from the threat management service 102 through to components of the network 104 equipped with the endpoint security management service 108. In turn, the endpoint computer security management services 108 of the enterprise threat management service 102 may upload policy and access requests back across the internet 128 and through to the threat management service 102. The internet 128, however, is also the path through which threats may be transmitted from their source, and one or more of the endpoint computer security facilities may be configured to protect a device outside the network 104 through locally deployed protective measures and through suitable interactions with the threat management service 102.

Thus, if the mobile client service were to attempt to connect to an unprotected connection point that is not a part of the network 104, the mobile client service, such as one or more of the client devices 124, may be required to request network interactions through the threat management service 102, where contacting the threat management service 102 may be performed prior to any other network action. In embodiments, the endpoint computer security service of the client device 124 may manage actions in unprotected network environments such as when the client service (e.g., the client device 126) is in a secondary location, where the endpoint computer security service may dictate which applications, actions, resources, users, etc. are allowed, blocked, modified, or the like.

Figure 2:
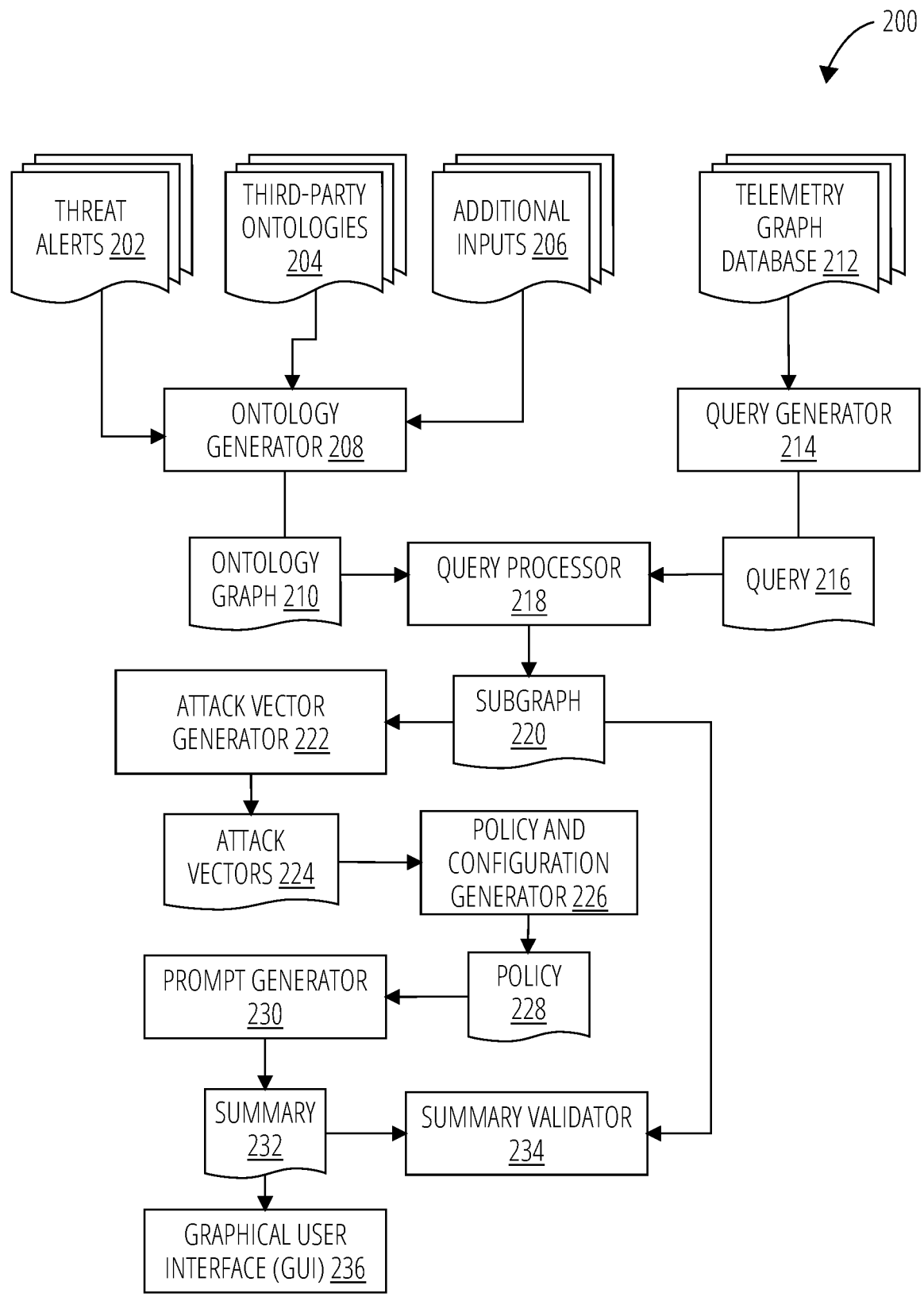
FIG. 2 illustrates a block diagram for an example of a system/device for providing a text summary of the information conveyed by a graph related to a security alert in accordance with some embodiments of the present technology.

FIG. 2 shows an example of an ontology summary system 200 that generates prompts summarizing the security incident giving rise to a threat alert. The ontology summary system 200 has an ontology generator 208 that receives various inputs, including, e.g., a threat alerts 202, a third-party ontologies 204, an additional inputs 206 Based on these inputs, the ontology generator 208 creates an ontology graph 210 that represents various relations between entities of computational instructions that have been executed by a computer/processor. These entities can include files, executable binary, processes, domain names, IP addresses, etc.

The ontology summary system 200 also has a query generator 214 that creates a query 216 based on values from a telemetry graph database 212, which stores graphs/patterns that represent respective malicious behaviors. The query 216 includes a query graph that is compared to various portions of the ontology graph 210 by the query processor 218. This comparison can be based on the topology (e.g., the spatial relations) and content (e.g., values of the vertices/nodes and relations expressed by the edges). When a match is found, the portion of the ontology graph 210 that matches the query graph is returned as subgraph 220.

The remainder of the ontology summary system 200 provides a summary 232 of subgraph 220 and then validates the summary and displays it in a graphical user interface (GUI) 236. First, the attack vector generator 222 converts the subgraph 220 of detected malware identified during penetration testing into a plurality of attack vectors 224. An attack vector is a specific route or method that malicious actors could employ to exploit vulnerabilities within a system, network, application, or device. It serves as a meticulously mapped-out pathway that outlines the sequence of steps an attacker might follow to compromise the intended target. The attack vectors with assist in the identification of potential weaknesses that necessitate mitigation to fortify the defenses of a system. These attack vectors encompass a wide array of techniques that can be categorized into various classes. Network-based attacks, for instance, revolve around leveraging vulnerabilities present in network protocols, services, or devices. Examples of these encompass activities such as network sniffing, distributed denial of service (DDoS) attacks, and the execution of Man-in-the-Middle (MitM) attacks that intercept communications.

In an example, during web-based attacks, penetration testing can detect tactics such as cross-site scripting (XSS), where attackers inject malicious scripts into web pages, and SQL injection, which involves manipulating databases through improperly sanitized inputs. Additionally, common attack vectors that target operating systems can be exposed by exploiting known vulnerabilities to gain unauthorized access. Examples of such threats include privilege escalation attacks buffer overflow attacks, and the execution of arbitrary code.

The attack vectors 224 generated by the attack vector generator 222 can exemplify a category of attack vectors that hinge on manipulating individuals into revealing sensitive information. This grouping encompasses tactics like phishing, which deceives users into disclosing their credentials or other confidential data, and pretexting, a method involving the creation of fictitious scenarios to mislead individuals into sharing information. Thus, the attack vectors 224 can identify vulnerabilities in wireless networks characterize wireless attacks, which can be exploited by attackers, which lead to unauthorized access to Wi-Fi networks or the initiation of various malicious activities.

Using the attack vectors 224, a policy and configuration generator 226 then generates a policy 228 for the prompt generator 230. Policy 228 directs the prompt generator 230 regarding the substance (e.g., the attack vectors 224) and style of the summary 232 to be created by the prompt generator 230. Policy 228 can include a comprehensive list of known attack vectors relevant to the system or software in consideration. This list could contain vulnerabilities, exploits, malware, and social engineering tactics. For each attack vector identified, policy 228 outlines which specific security measures and configurations are necessary to mitigate or prevent any associated attacks. These measures could encompass updated configurations for network appliances in the wireless network, security controls, wireless network configurations, and network access controls.

Additionally, the generated policy 228 could include mappings between attack vectors and corresponding security measures to ensure that appropriate steps are taken for each type of attack vector. The mapping could include configurations that are identified as being most effective against specific attack vectors, and malware that has previously penetrated the security system, allowing for the ability to take proactive steps to protect the network and the associated systems and data from malicious actions and attackers. In some examples, the prompt can identify a plurality of relationships between wireless appliances or nodes within the network. For example, the prompt can express more complex relationships between three or more nodes, thereby making broader connections that can help security analysts more quickly comprehend the information expressed by subgraph 220. Thus, security analysts can more quickly assess a threat alert stimulated by identified penetration of the network system by malware.

The summary validator 234 checks summary 232 to determine whether the summary is consistent with subgraph 220, thereby ensuring that important aspects of the subgraph were not lost or misinterpreted in the translation from subgraph 220 to summary 232. For example, a machine learning (ML) method can convert the summary back to a graph that is compared to the subgraph 220 to determine whether features of the subgraph have been preserved.

Additionally, the summary 232 can be displayed in the GUI 236. The GUI 236 can include both the text of the summary 232 and a visual representation of the subgraph 220. The subgraph 220 provides ground truth, and the summary 232 provides a more easily comprehended mechanism for understanding the subgraph 220. According to certain non-limiting examples, a user can select a portion of the text of the summary 232, and in response, the GUI 236 highlights a corresponding portion of the subgraph associated with the selected text. Thus, starting from the text of the summary, a security analyst can quickly find the relevant features in the subgraph 220 that correspond to portions of the text of the summary. Then referring to the corresponding region of the subgraph 220, the security analyst can verify that, for the relevant features, the relations expressed in the text are consistent with the corresponding region of the subgraph 220, thereby confirming a correct understanding of the threat.

Figure 3:
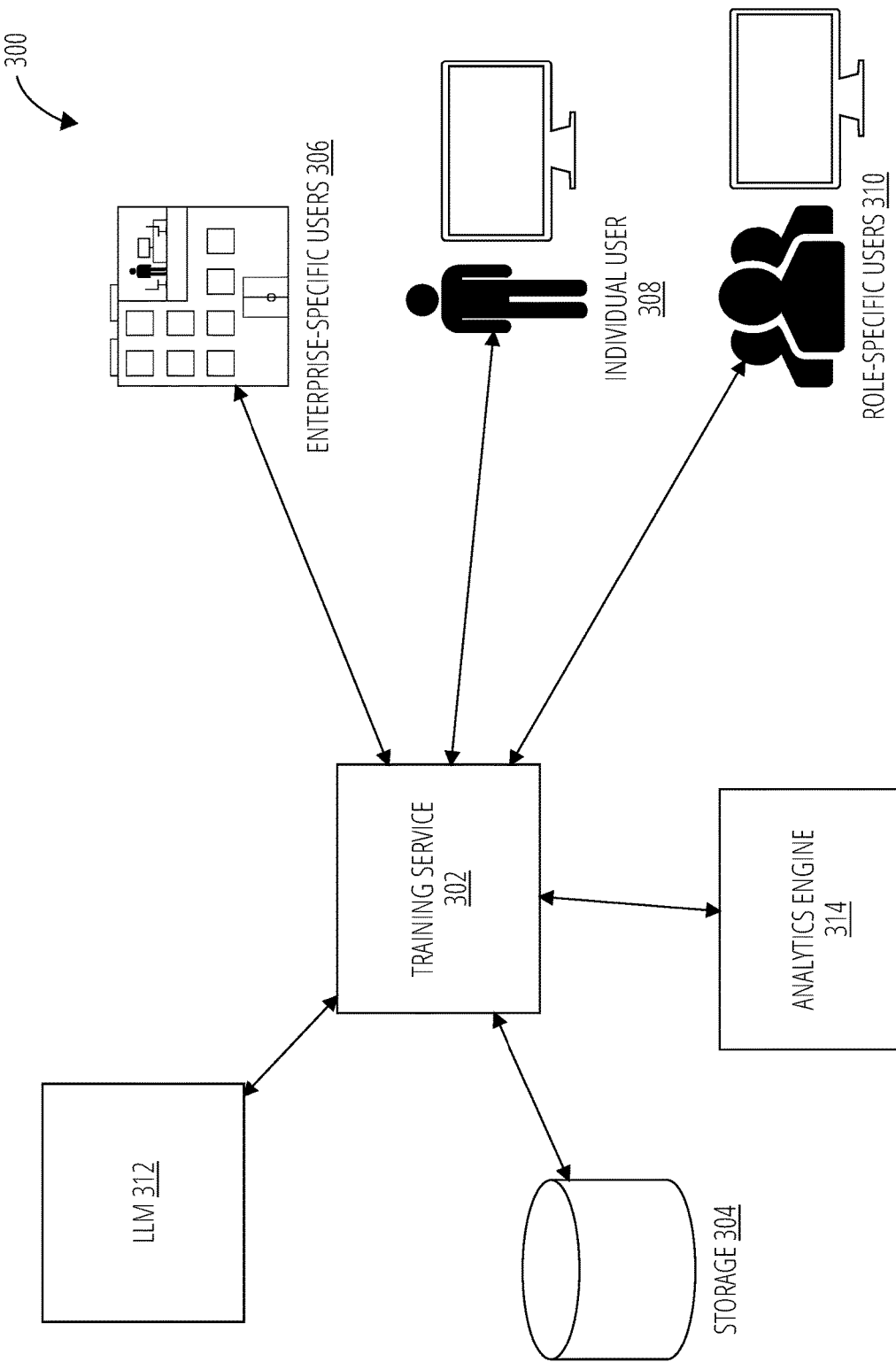
FIG. 3 illustrates an architecture for a phishing training service in accordance with some embodiments of the present technology.

FIG. 3 illustrates an architecture for a phishing training system 300 in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The training service 302 within the training system 300 encompasses any service embedded within an intrusion prevention system, designed to gather data concerning user interactions with messages across user accounts. The training service 302 orchestrates and monitors the collective awareness of users within an enterprise concerning the prevention of spear phishing attacks. Moreover, the training service 302 specifically identifies vulnerabilities related to spear phishing, necessitating targeted remediation efforts to improve prevention efforts with regards to enterprise-specific users 306, individual users 308, and role-specific users 310.

The training service 302 receives messages originating from one or more user accounts within an enterprise. One or more of these messages can be provided to a trained LLM 312 through a prompt that requests the LLM to generate a phishing message that closely resemble messages one or more users typically receive in their inbox, and further would illicit typical user interactions that could create a vulnerability in thwarting an attempted spear phishing attack. The generated messages are disseminated by the training service 302 throughout the enterprise network, employing a hierarchical approach that may encompass distribution at the enterprise level comprising enterprise-specific users 306, role-specific levels comprising role-specific users 310, or targeting individual user 308 accounts.

Moreover, the training service 302 can monitor the interactions elicited by these campaign emails by each user account receiving one of the targeted emails generated by LLM 312. The training service 302 can collect feedback and data pertinent to user responses and interactions with one or more of the messages, which are subsequently subjected to analysis by an Analytics Engine 314. The Analytics Engine 314 performs an analysis of each of the interactions by the users that enables the identification of trends, vulnerabilities, and areas necessitating further intervention, contributing to the continuous enhancement of the enterprise's phishing awareness and prevention strategies. Data derived from the analysis conducted by the Analytics Engine (314), along with the messages that prompted interactions from one or more user accounts, are stored within a dedicated storage 304. This repository serves as a reference point, facilitating subsequent targeted training techniques aimed at addressing vulnerabilities identified by the training service 302 when requesting additional messages from the LLM 312 via additional prompts.

The Analytics Engine 314 further can conduct an in-depth analysis of the collected data to establish a scoring system, encompassing efficacy metrics tailored to individual users, specific roles, and the organization as a whole. Upon generating scores, the training service 302 utilizes this information to initiate another request to the LLM 312, prompting the LLM 312 to refine the type of messages further to be geared explicitly towards generating emails for a subsequent, more targeted campaign. The scores can be applied to enterprise-specific users 306, individual users 308, and role-specific users 310 in the network, to determine whether users associated with these groups have met a threshold score.

In instances where a threshold score is not met, the training service 302 orchestrates the dispatch of multiple email campaigns, each strategically tailored to address particular areas of exposure or evasion techniques identified through initial interactions. The overarching objective is to augment the effectiveness of phishing training initiatives. These additional campaigns can be precisely targeted towards various user segments, including enterprise-specific users 306, individual user 308, and role-specific users 310, to improve the efficacy of the training when addresses spear phishing related vulnerabilities.

Figure 4:
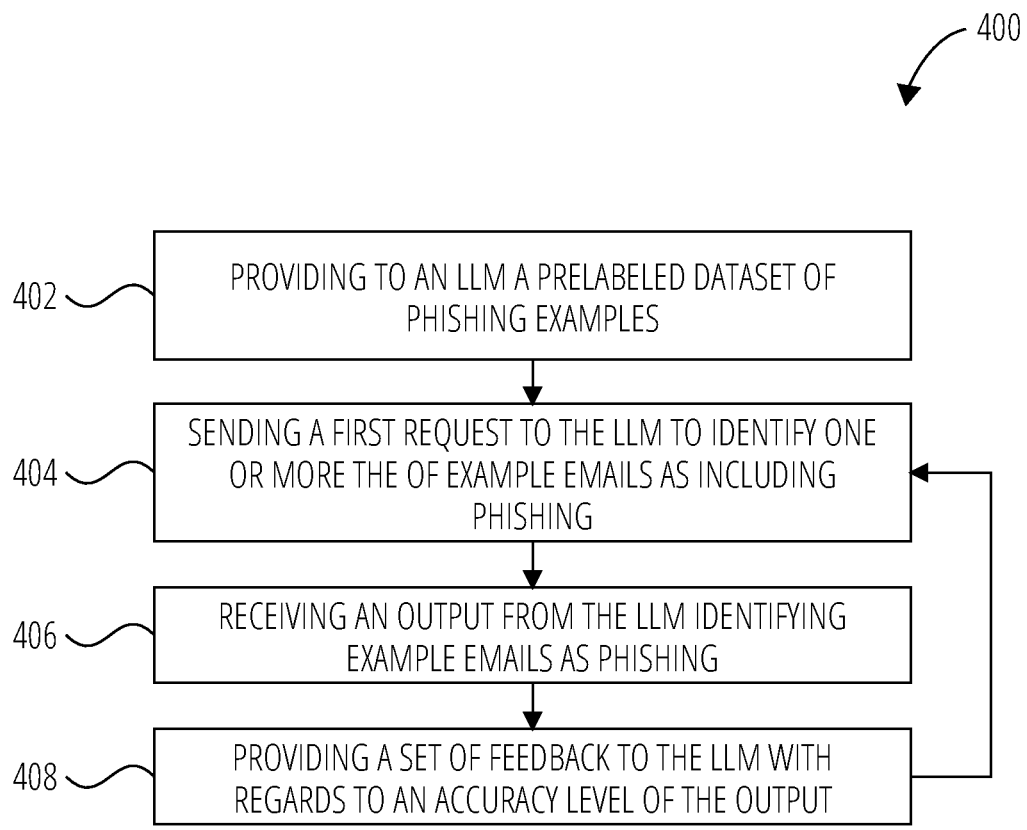
FIG. 4 illustrates an example process for training a large language model (LLM) to generate variant phishing electronic messages according to some aspects of the disclosure.

FIG. 4 illustrates an example process 400 for training an LLM to generate variant phishing electronic messages according to some aspects of the disclosure. Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements the process 400 may perform functions at substantially the same time or in a specific sequence.

According to some examples, the method includes providing to an LLM a prelabeled dataset of phishing examples at block 402. For example, the training service 302 illustrated in FIG. 3 may provide to an LLM 312 a prelabeled dataset of phishing examples, which can consist of a plurality of messages that user accounts would typically receive. This dataset encompasses not only non-phishing example messages but also phishing messages tailored to specific scenarios or utilizing predefined phishing techniques. Additionally, in some instances, the prelabeled dataset can include phishing examples incorporating homoglyphic characters, commonly known as 'confusables', as a phishing technique. Furthermore, historical data related to previous phishing attacks experienced by users in the network may also be incorporated into the dataset, enriching the training material with real-world insights and scenarios.

According to some examples, the method includes sending a first request to the LLM to identify one or more of the example messages including phishing at block 404. For example, the training service 302 illustrated in FIG. 3 may send a first request to the LLM 312 to identify one or more example messages in the prelabeled dataset as including phishing. To accomplish this task, the LLM can tokenize the messages, breaking them down into smaller units such as words or phrases, and analyze the content to determine whether one or more of the messages exhibit characteristics indicative of phishing. Through this process of tokenization and analysis, the LLM can effectively discern patterns and features associated with phishing within the dataset, aiding in the identification of phishing examples.

According to some examples, the method includes receiving an output from the LLM identifying example emails as phishing at block 406. For example, the training service 302 illustrated in FIG. 3 may receive an output from the LLM 312 identifying example emails as phishing. The training service 302 can analyze the output to determine the accuracy of the determinations by the LLM 312.

According to some examples, the method includes providing a set of feedback to the LLM with regards to an accuracy level of the output at block 408. For example, the training service 302 illustrated in FIG. 3 may provide a set of feedback to the LLM 312 regarding the accuracy level of the output. The steps in block 402-block 408 can be performed in a loop, allowing the training service to continually train the LLM until it achieves a predetermined accuracy level threshold, indicating that the LLM can sufficiently identify phishing-related messages. By iteratively providing feedback and refining the LLM's training, the training service ensures that the model becomes adept at accurately distinguishing phishing examples from non-phishing examples.

Figure 5:
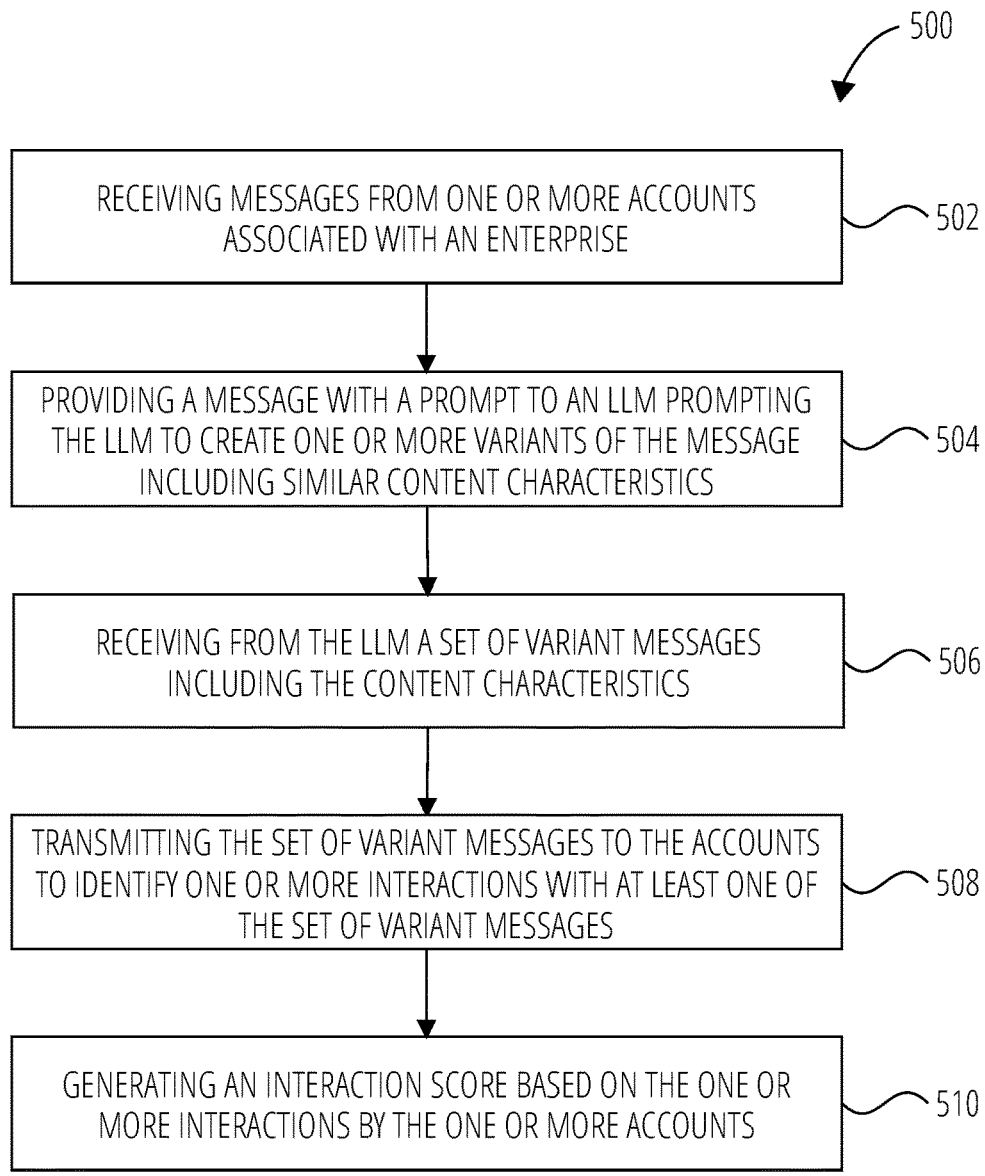
FIG. 5 illustrates an example process for training user accounts in an enterprise for attempted phishing attacks according to some aspects of the disclosure.

FIG. 5 illustrates an example process for training user accounts in an enterprise for attempted phishing attacks according to some aspects of the disclosure. Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

According to some examples, the method includes receiving messages from one or more accounts associated with an enterprise at block 502. For example, the training service 302 depicted in FIG. 3 may gather messages originating from one or more accounts affiliated with an enterprise. These messages are actively sourced from the user accounts and comprise a diverse array, encompassing attempted spear phishing attacks, records of prior training endeavors, as well as messages routinely engaged with by a user account.

According to some examples, the method includes providing a message with a prompt to an LLM which prompts the LLM to create one or more variants of the message including similar content characteristics at block 504. For example, the training service 302 depicted in FIG. 3 may issue a message accompanied by a prompt to an LLM 312, directing it to generate one or more variants of the message with similar content characteristics. These prompts task the LLM 312 with creating variants of the received messages containing specific content characteristics such as variant hyperlinks, domain names, and homoglyphic characters. The variants are generated based on the prelabeled dataset and are tailored to replicate the content characteristics observed in known phishing messages, as well as those present in the messages received from one or more accounts.

According to some examples, the method includes receiving from the LLM at least one variant message including the content characteristics at block 506. For example, the training service 302 illustrated in FIG. 3 may receive at least one variant message from the LLM 312, encompassing the specified content characteristics. These variant messages are purposefully crafted to incorporate one or more phishing characteristics identified during the training of the LLM 312 with the prelabeled dataset.

According to some examples, the method includes transmitting the variant messages to the accounts to identify one or more interactions with at least one of the variant messages at block 508. For example, the training service 302 illustrated in FIG. 3 may transmit the variant messages to the accounts to identify one or more elicited interactions with at least one of the variant messages.

According to some examples, the method includes generating an interaction score based on the one or more interactions by the one or more accounts at block 510. For example, the training service 302 illustrated in FIG. 3 may generate an interaction score to the one or more interactions by the one or more accounts. The interaction score is generated by the training service 302 collecting one or more interactions with the variant messages by the user accounts in a database. These interactions are then analyzed by Analytics Engine 314 to identify patterns associated with known vulnerabilities to phishing attempts. Based on these patterns, Analytics Engine 314 applies a score indicating at least one user account's susceptibility to the identified vulnerabilities observed in the interactions.

Figure 6:
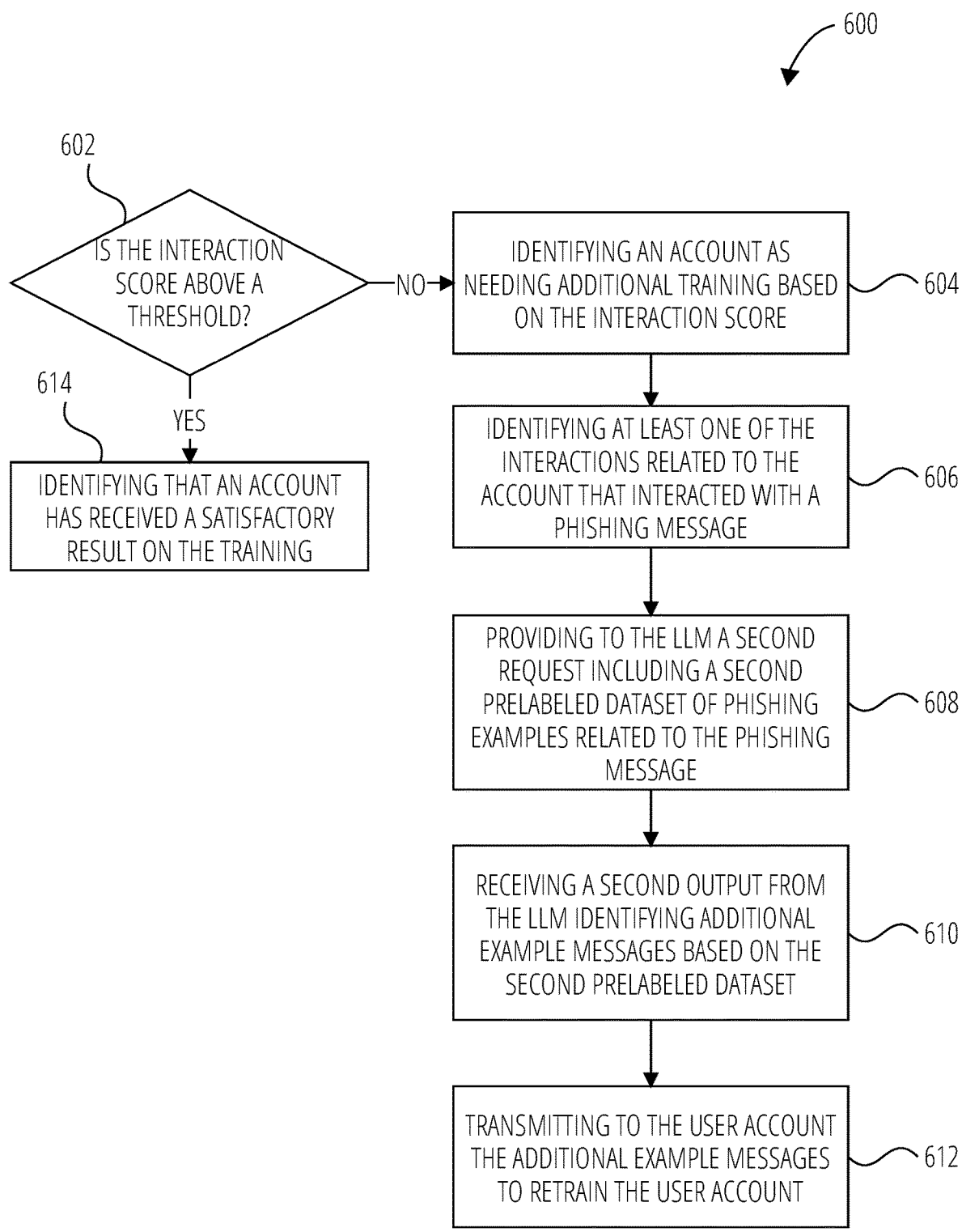
FIG. 6 illustrates an example process for identifying whether additional training is to be provided for user accounts based on interactions with LLM generated electronic messages according to some aspects of the disclosure.

FIG. 6 illustrates an example process for identifying whether additional training is to be provided for user accounts based on interactions with LLM-generated electronic messages according to some aspects of the disclosure. Although the example process 600 depicts a particular sequence of operations, the sequence may be altered without departing from the scope of the present disclosure. For example, some of the operations depicted may be performed in parallel or in a different sequence that does not materially affect the function of the process 600. In other examples, different components of an example device or system that implements the process 600 may perform functions at substantially the same time or in a specific sequence.

According to some examples, the method includes determining if the interaction score is above a threshold at decision block 602. For example, the training service 302 illustrated in FIG. 3 may determine whether the interaction score for a first account is at, above or below a predetermined threshold. The interaction score indicates the efficacy level of one or more enterprise-specific users 306, individual users 308, or role-specific users 310 in an enterprise. The interaction score is representative of one or more interactions by a user account with one or more portions of the message, the interactions with one or more portions can be related to a phishing vulnerability.

According to some examples, the method includes identifying an account as needing additional training based on the interaction score at block 604. For example, the training service 302 illustrated in FIG. 3 may identify that the first account has received a non-satisfactory result based on the one or more interactions with the set of variant messages. Based on the interaction score not meeting a predetermined threshold, the training service 302 can determine that one or more user accounts need additional training. The non-satisfactory interaction score can further identify that one or more user accounts have not completed an assigned category of phishing training. These user accounts can be identified by the training service as enterprise-specific users 306, individual users 308, or role-specific users 310.

According to some examples, the method includes identifying at least one of the interactions related to the account that interacted with a phishing message at block 606. For instance, within the depicted training service 302 of FIG. 3, there may be identification of interactions associated with the account, indicative of engagement with a phishing message. Upon identification, these interactions are flagged as potential security risks, leading to the determination that the user account is susceptible to spear phishing.

According to some examples, the method includes providing the LLM with a second request related to a type of phishing message at block 608. For example, the training service 302 illustrated in FIG. 3 may provide the LLM with a second request, via a prompt, related to the type of phishing messages. In some embodiments, the prompt can include labels describing the phishing example. The labels can include information on the type of interaction a user had with the phishing message. This would cause LLM 312 to generate more targeted messages related to the interaction type.

According to some examples, the method includes receiving a second output from the LLM identifying additional example messages in response to the second request at block 610. For example, the training service 302 illustrated in FIG. 3 may receive a second output from the LLM 312 identifying additional example messages. These messages are intended to target scenarios where Analytics Engine 314, in collaboration with the training service 302, has applied an interaction score below the threshold to the user account.

According to some examples, the method includes transmitting to the user account the additional example messages to retrain the user account at block 612. For example, the training service 302 illustrated in FIG. 3 may transmit to the user account the additional example messages to retrain the user account. As provided in the discussion of block 510 in FIG. 5, an interaction score can be continuously generated based on additional interactions conducted by the user account. In this iterative process, the newly calculated interaction score is analyzed to ascertain whether it surpasses the established threshold.

According to some examples, the method includes identifying that an account has received a satisfactory result on the training at block 614. For example, the training service 302 illustrated in FIG. 3 may identify that an account has received a satisfactory result on the training based on an analysis performed by Analytics Engine 314. The satisfactory outcome may signify that one or more user accounts have successfully completed training linked to the initial set of generated variant messages. Such completion suggests that a user account may no longer require supplementary training. Alternatively, it may prompt the identification of additional categories for phishing training, thereby necessitating the LLM 312 to generate further variants of the received messages pertaining to the initial account.

Figure 7A:
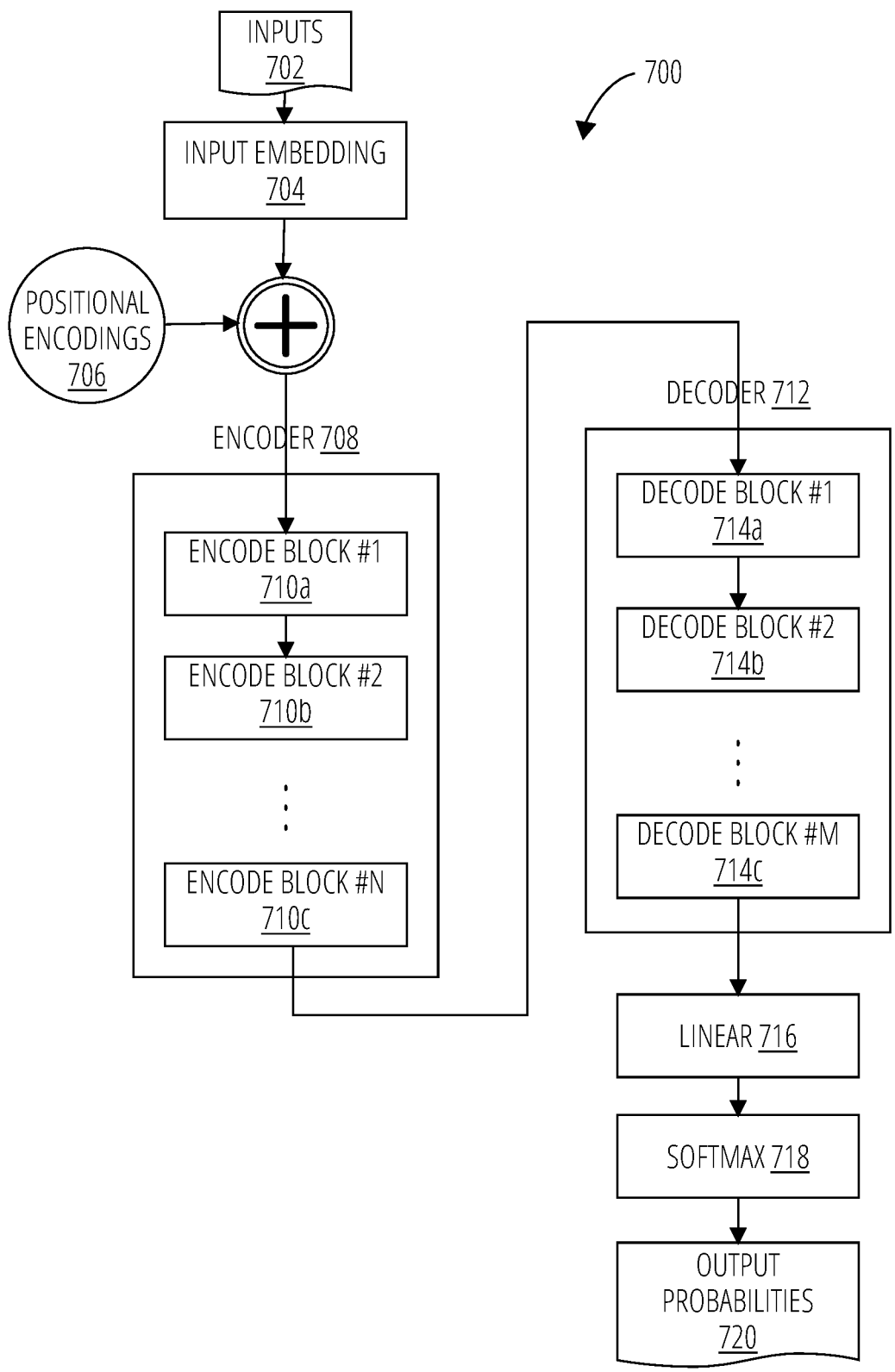
FIG. 7A illustrates a block diagram for an example of a transformer neural network architecture in accordance with some embodiments of the present technology.

FIG. 7A illustrates a block diagram for an example of a transformer neural network architecture, in accordance with certain embodiments. As discussed above, the prompt generator 230 in FIG. 2 can use a transformer architecture 700, such as a Generative Pre-trained Transformer (GPT) model. Additionally, or alternatively, the prompt generator 230 can include a Bidirectional Encoder Representations from Transformers (BERT) model. According to certain non-limiting examples, the transformer architecture 700 is illustrated in FIG. 7A through FIG. 7C as including inputs 702, an input embedding block 704, positional encodings 706, an encoder 708 (e.g., encode blocks 710*a*, 710*b*, and 710*c*), a decoder 712 (e.g., decode blocks 714*a*, 714*b*, and 714*c*), a linear block 716, a softmax block 718, and output probabilities 720.

The input embedding block 704 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 704 can be learned embeddings to convert the input tokens and output tokens to vectors of dimension that have the same dimension as the positional encodings, for example.

The positional encodings 706 provide information about the relative or absolute position of the tokens in the sequence. According to certain non-limiting examples, the positional encodings 706 can be provided by adding positional encodings to the input embeddings at the inputs to the encoder 708 and decoder 712. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

Figure 7B:
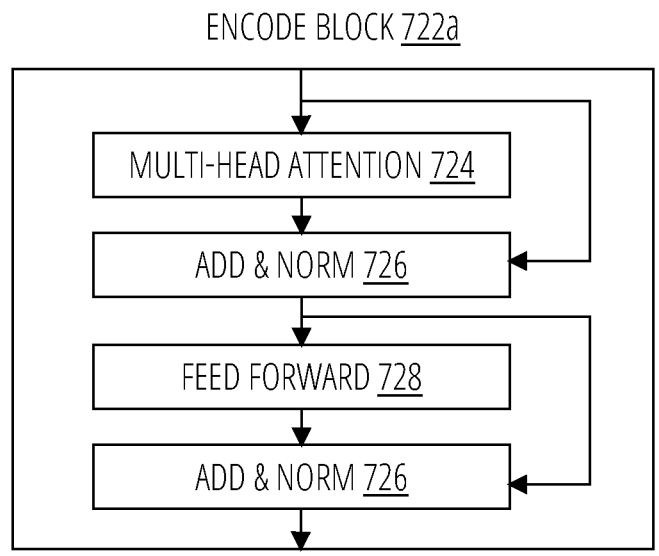
FIG. 7B illustrates a block diagram for an example of an encoder of the transformer neural network architecture in accordance with some embodiments of the present technology.
Figure 7C:
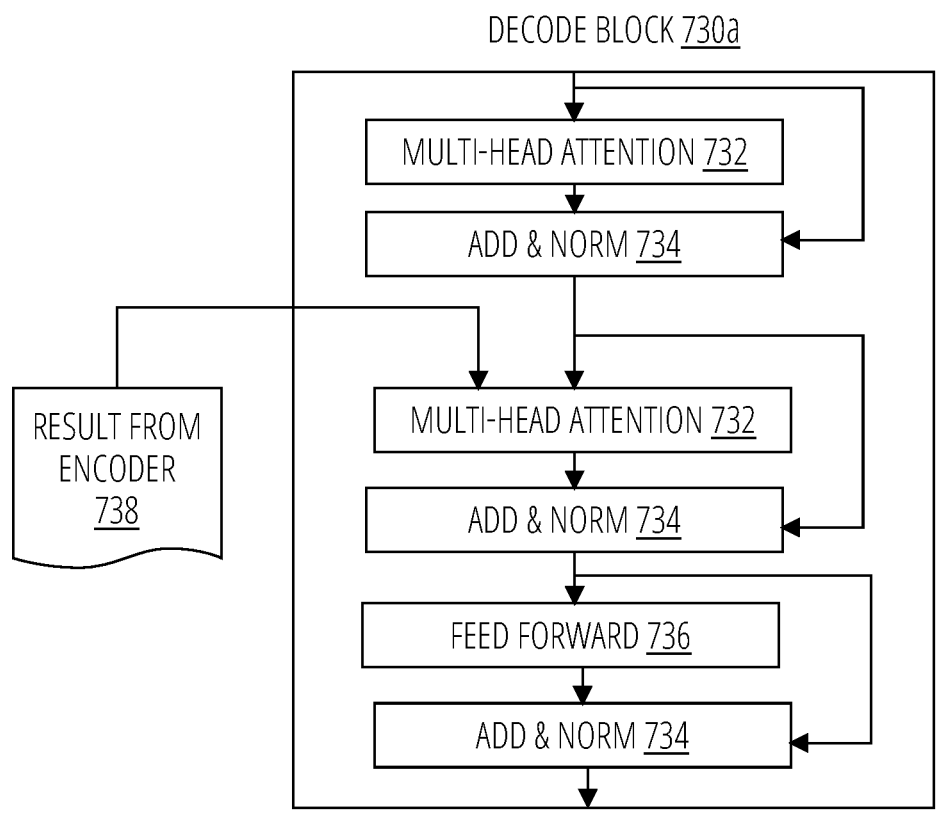
FIG. 7C illustrates a block diagram for an example of a decoder of the transformer neural network architecture in accordance with some embodiments of the present technology.

FIG. 7B illustrates a block diagram for an example of an encoder of the transformer neural network architecture, in accordance with certain embodiments.

The encoder 708 uses stacked self-attention and point-wise, fully connected layers. The encoder 708 can be a stack of N identical layers (e.g., N=6), and each layer is an encode block, as illustrated by encode block 710a shown in FIG. 7B. Each encode block 710a-710c has two sub-layers: (i) a first sub-layer has a multi-head attention block 724 and (ii) a second sub-layer has a feed forward block 728, which can be a position-wise fully connected feed-forward network. The feed forward block 728 can use a rectified linear unit (ReLU).

The encoder 708 uses a residual connection around each of the two sub-layers, followed by an add & norm block 726, which performs normalization (e.g., the output of each sub-layer is LayerNorm(x+Sublayer(x)), i.e., the product of a layer normalization "LayerNorm" time the sum of the input "x" and output "Sublayer(x)" pf the sublayer LayerNorm(x+Sublayer(x)), where Sublayer(x) is the function implemented by the sub-layer). To facilitate these residual connections, all sub-layers in the model, as well as the embedding layers, produce output data having a same dimension.

FIG. 7C illustrates a block diagram for an example of a decoder of the transformer neural network architecture, in accordance with certain embodiments.

Similar to encoder 708, decoder 712 uses stacked self-attention and point-wise, fully connected layers. The decoder 712 can also be a stack of M identical layers (e.g., M=6), and each layer is a decode block 414, as illustrated by decode block 714a shown in FIG. 7C. In addition to the two sub-layers (i.e., the sublayer with the multi-head attention block 724 and the sub-layer with the feed-forward block) found in the encode block 710a, the decode block 714a can include a third sub-layer, which performs multi-head attention over the output of the encoder stack. Similar to the encoder 708, the decoder 712 uses residual connections around each of the sub-layers, followed by layer normalization. Additionally, the sub-layer with the multi-head attention block 724 can be modified in the decoder stack to prevent positions from attending to subsequent positions. This masking, combined with the fact that the output embeddings are offset by one position, ensures that the predictions for position 'i' can depend only on the known output data at positions less than i.

The linear block 716 can be a learned linear transformation. For example, when the transformer architecture 700 is being used to translate from a first language into a second language, the linear block 716 projects the output from the last decode block 714c into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 718 then turns the scores from the linear block 716 into output probabilities 720 (which add up to 1.0). In each position, the index provides for the word with the highest probability, and then map that index to the corresponding word in the vocabulary. Those words then form the output sequence of the transformer architecture 700. The softmax operation is applied to the output from the linear block 716 to convert the raw numbers into the output probabilities 720 (e.g., token probabilities), which are used in the process of generating the summary 232 based on the prompt generator, generating the policy 228.

Figure 8A:
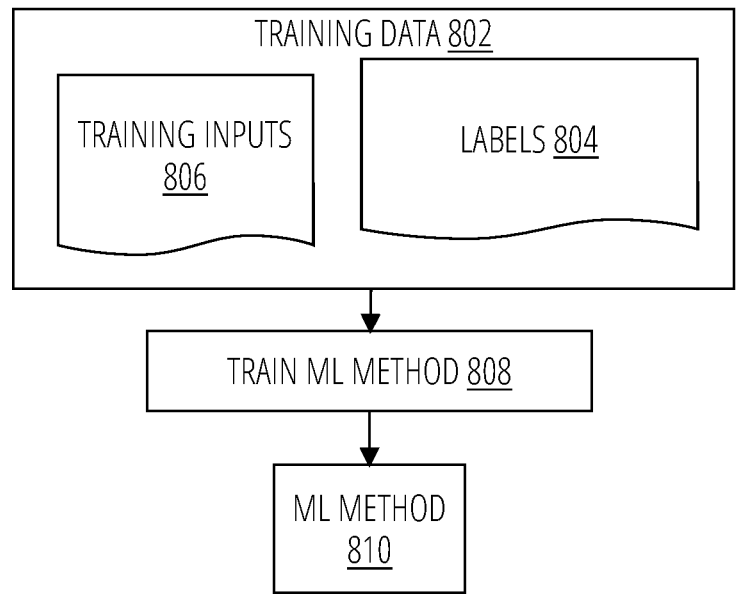
FIG. 8A illustrates an aspect of the subject matter in accordance with one embodiment.

FIG. 8A illustrates an example of training an ML method 810 in accordance with certain embodiments. In step 808, training data 802, which includes the labels 804 and the 806) is applied to train the ML method 810. For example, the ML method 810 can be an artificial neural network (ANN) that is trained via supervised learning using a backpropagation technique to train the weighting parameters between nodes within respective layers of the ANN. In supervised learning, the training data 802 is applied as an input to the ML method 810, and an error/loss function is generated by comparing the output from the ML method 810 with the labels 804. The coefficients of the ML method 810 are iteratively updated to reduce an error/loss function. The value of the error/loss function decreases as outputs from the ML method 810 increasingly approximate the labels 804. In other words, ANN infers the mapping implied by the training data, and the error/loss function produces an error value related to the mismatch between the labels 804 and the outputs from the ML method 810 that are produced as a result of applying the training inputs 806 to the ML method 810.

For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient back-propagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribidre update, Powell-Beale restart, and scaled conjugate gradient). Additionally, evolutionary methods, such as gene expression programming, simulated annealing, expectation-maximization, non-parametric methods, and particle swarm optimization, can also be used for training the ML method 810.

The Train ML method in step 808 can also include various techniques to prevent overfitting to the training data 802 and for validating the trained ML method 810. For example, bootstrapping and random sampling of the training data 802 can be used during training.

In addition to supervised learning used to initially train the ML method 810, the ML method 810 can be continuously trained while being used by using reinforcement learning based on the network measurements and the corresponding configurations used on the network. The ML method 810 can be cloud-based and trained using network measurements and the corresponding configurations from other networks that provide feedback to the cloud.

Further, other machine learning (ML) algorithms can be used for the ML method 810, and the ML method 810 is not limited to being an ANN. For example, there are many machine-learning models, and the ML method 810 can be based on machine-learning systems that include generative adversarial networks (GANs) that are trained, for example, using pairs of network measurements and their corresponding optimized configurations.

As understood by those of skill in the art, machine-learning-based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 8B:
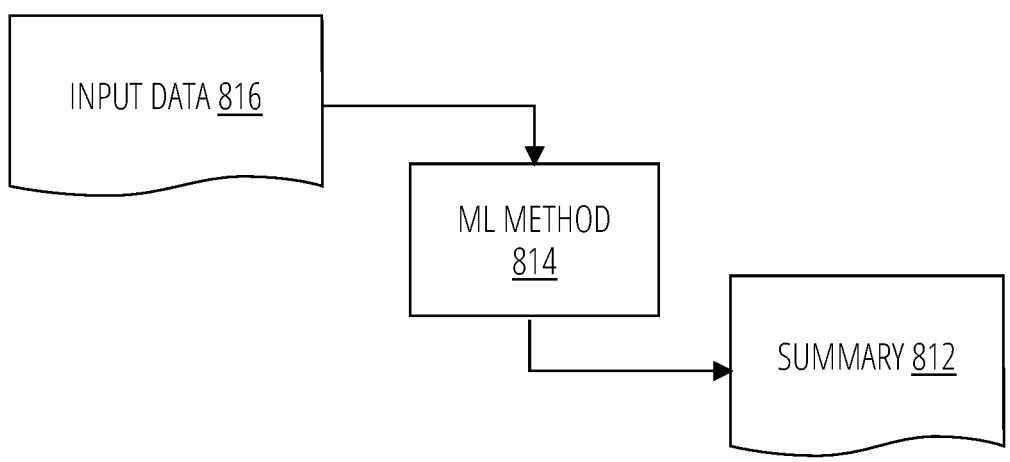
FIG. 8B illustrates an aspect of the subject matter in accordance with one embodiment.

FIG. 8B illustrates an example of using the trained ML method 810. The input data 816 are applied to the trained ML method 810 to generate the outputs, which can include the summary 812.

Figure 9:
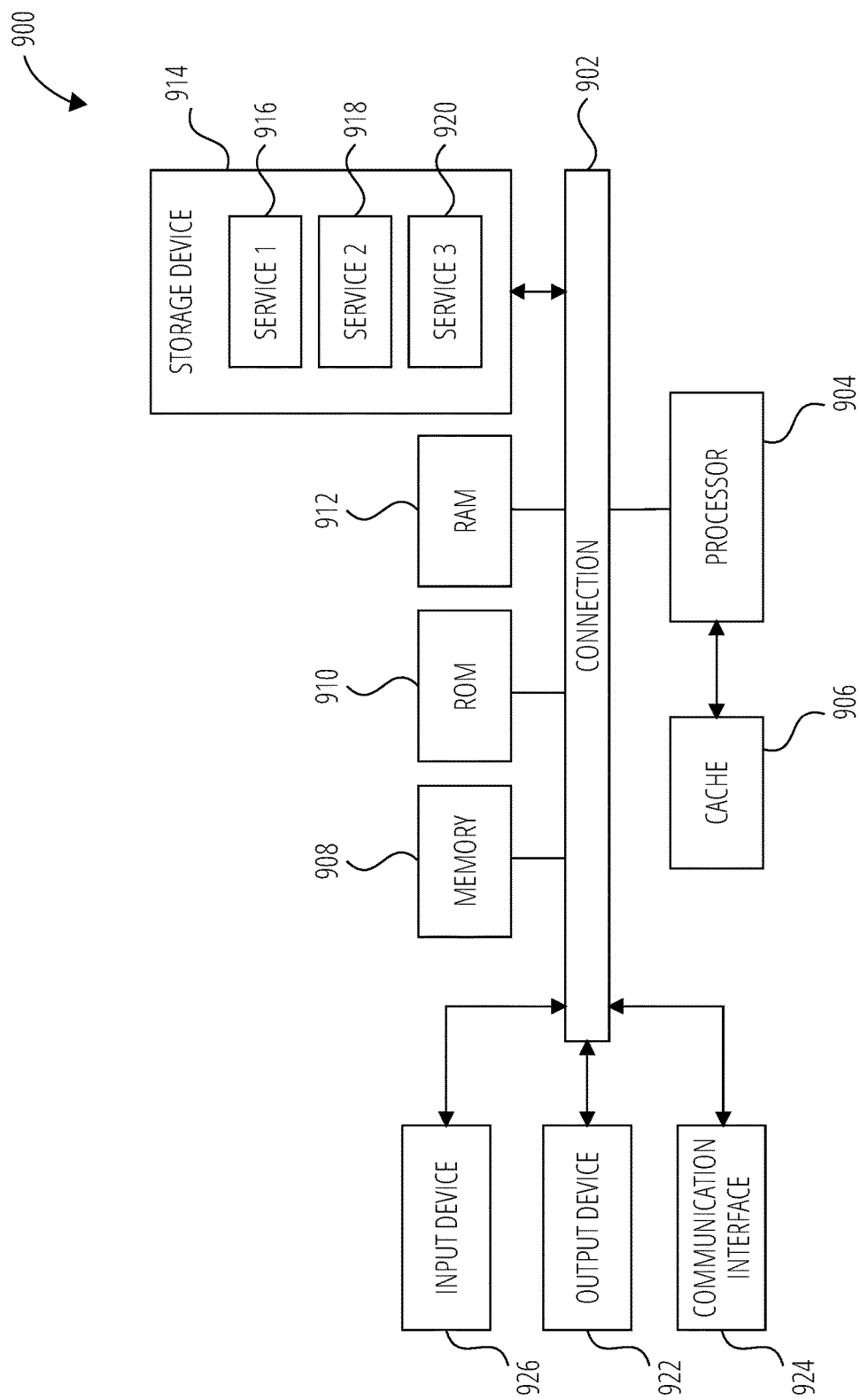
FIG. 9 illustrates an example system for implementing some aspects of the subject matter in accordance with some embodiments.

FIG. 9 shows an example of computing system 900, which can be for example any computing device making up the system network 104 of FIG. 3, or any component thereof in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (central processing unit (CPU) or processor) 904 and connection 902 that couples various system components including system memory 908, such as read-only memory (ROM) 910 and random-access memory (RAM) 91 to processor 904. Computing system 900 can include a cache of high-speed memory 908 connected directly with, in close proximity to, or integrated as part of processor 904.

Processor 904 can include any general-purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the hardware components, such as processor 904, connection 902, output device 922, etc., to carry out the function.

For clarity of explanation, in some instances the present technology may be presented as including individual performs functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, computer-readable storage devices, mediums, and memories can include a cable or wireless signal containing a bit stream and the like. However, when mentioned, non-transitory computer-readable storage media expressly exclude energy, carrier signals, electromagnetic waves, and signals per se.

Methods according to the above-described examples can be implemented using computer-executable instructions that are stored or otherwise available from computer readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware, and/or software and can take any of a variety of form factors. Typical examples of such form factors include servers, laptops, smartphones, small form factor personal computers, personal digital assistants, and so on. The functionality described herein can also be embodied in peripherals or add-in cards. Such functionality can also be implemented on a circuit board among different chips or processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some clauses of the present technology include:

Clause 1. A method comprising: training an LLM with a prelabeled dataset of example phishing messages, the LLM being configured to identify one or more phishing messages based on the prelabeled dataset; receiving messages from one or more accounts associated with an enterprise; providing a message with a prompt to the LLM, the message prompting the LLM to create one or more variants of the received messages that includes similar content characteristics; receiving from the LLM a set of variant messages including the content characteristics, the set of variant messages generated to include one or more phishing characteristics identified during training with the prelabeled dataset; transmitting the set of variant messages to the accounts to identify one or more interactions with at least one of the set of variant messages; and generating an interaction score based on the one or more interactions by the one or more accounts.

Clause 2. The method of clause 1, wherein training the LLM comprises: providing to the LLM the prelabeled dataset of phishing messages; sending a first request to the LLM to identify the one or more phishing messages in a first set of training messages; receiving an output from the LLM identifying the one or more phishing messages in the first set of training messages as including phishing; and providing a set of feedback to the LLM including an accuracy level of the output.

Clause 3. The method of clause 1, further comprising: determining that the interaction score for a first account is above a predetermined threshold; and identifying that the first account has received a satisfactory result based on the one or more interactions with the set of variant messages, the satisfactory result indicating that the first account has completed at least one category of phishing training.

Clause 4. The method of clause 3, wherein the satisfactory result indicates one or more of a completion of training for the first account or an additional category of phishing training to prompt the LLM to generate additional variants of the received messages related to the first account.

Clause 5. The method of clause 1, further comprising: determining that the interaction score for a first account is below a predetermined threshold; identifying that the first account has received a non-satisfactory result based on the one or more interactions with the set of variant messages, the non-satisfactory result indicating that the first account has not completed an assigned category of phishing training; identifying at least one of the interactions related to the first account that interacted with a phishing message; providing to the LLM a second request including a second prelabeled dataset of phishing examples related to the phishing message; receiving a second output from the LLM identifying additional example emails based on the second prelabeled dataset; and transmitting to the first account the additional example emails to retrain the first account.

Clause 6. The method of clause 1, wherein the prompt to the LLM further comprises: prompting the LLM to create the one or more variants of the received messages that include content characteristics including variant hyperlinks, domain names, and homoglyphic characters, the variant messages being generated based on the prelabeled dataset and configured to mimic the content characteristics observed in known phishing messages and the received messages from the one or more accounts.

Clause 7. The method of clause 1, wherein the interaction score is generated by: collecting the one or more interactions with the set of variant messages by the one or more accounts in a database; analyzing the one or more interactions to identify patterns in the interactions associated with known vulnerabilities to phishing attempts; and applying a score based on at least one user accounts susceptibility to the known vulnerabilities indicated by the one or more interactions.

Clause 8. A network device comprising: one or more memories having computer-readable instructions stored therein; and one or more processors configured to execute the computer-readable instructions to: train an LLM with a prelabeled dataset of example phishing messages, the LLM being configured to identify one or more phishing messages based on the prelabeled dataset; receive messages from one or more accounts associated with an enterprise; provide a message with a prompt to the LLM, the message prompting the LLM to create one or more variants of the received messages that includes similar content characteristics; receive from the LLM a set of variant messages including the content characteristics, the set of variant messages generated to include one or more phishing characteristics identified during training with the prelabeled dataset; transmit the set of variant messages to the accounts to identify one or more interactions with at least one of the set of variant messages; and generate an interaction score based on the one or more interactions by the one or more accounts.

Clause 9. The network device of clause 8, wherein training the LLM comprises: providing to the LLM the prelabeled dataset of phishing messages; sending a first request to the LLM to identify the one or more phishing messages in a first set of training messages; receiving an output from the LLM identifying the one or more phishing messages in the first set of training messages as including phishing; and providing a set of feedback to the LLM including an accuracy level of the output.

Clause 10. The network device of clause 8, wherein the instructions further configure the network device to: determine that the interaction score for a first account is above a predetermined threshold; and identify that the first account has received a satisfactory result based on the one or more interactions with the set of variant messages, the satisfactory result indicating that the first account has completed at least one category of phishing training.

Clause 11. The network device of clause 10, wherein the satisfactory result indicates one or more of a completion of train for the first account or an additional category of phishing training to prompt the LLM to generate additional variants of the received messages related to the first account.

Clause 12. The network device of clause 8, wherein the instructions further configure the network device to: determine that the interaction score for a first account is below a predetermined threshold; identify that the first account has received a non-satisfactory result based on the one or more interactions with the set of variant messages, the non-satisfactory result indicating that the first account has not completed an assigned category of phishing training; identify at least one of the interactions related to the first account that interacted with a phishing message; provide to the LLM a second request including a second prelabeled dataset of phishing examples related to the phishing message; receive a second output from the LLM identifying additional example emails based on the second prelabeled dataset; and transmit to the first account the additional example emails to retrain the first account.

Clause 13. The network device of clause 8, wherein the prompt to the LLM further comprises: prompt the LLM to create the one or more variants of the received messages that include content characteristics including variant hyperlinks, domain names, and homoglyphic characters, the variant messages being generated based on the prelabeled dataset and configured to mimic the content characteristics observed in known phishing messages and the received messages from the one or more accounts.

Clause 14. The network device of clause 8, wherein the interaction score is generated by: collecting the one or more interactions with the set of variant messages by the one or more accounts in a database; analyzing the one or more interactions to identify patterns in the interactions associated with known vulnerabilities to phishing attempts; and applying a score based on at least one user accounts susceptibility to the known vulnerabilities indicated by the one or more interactions.

Clause 15. A non-transitory computer-readable storage medium comprising computer-readable instructions, which when executed by one or more processors of a network appliance, cause the network appliance to: train an LLM with a prelabeled dataset of example phishing messages, the LLM being configured to identify one or more phishing messages based on the prelabeled dataset; receive messages from one or more accounts associated with an enterprise; provide a message with a prompt to the LLM, the message prompting the LLM to create one or more variants of the received messages that includes similar content characteristics; receive from the LLM a set of variant messages including the content characteristics, the set of variant messages generated to include one or more phishing characteristics identified during training with the prelabeled dataset; transmit the set of variant messages to the accounts to identify one or more interactions with at least one of the set of variant messages; and generate an interaction score based on the one or more interactions by the one or more accounts.

Clause 16. The non-transitory computer-readable storage medium of clause 15, wherein training the LLM comprises: provide to the LLM the prelabeled dataset of phishing messages; send a first request to the LLM to identify the one or more phishing messages in a first set of training messages; receive an output from the LLM identifying the one or more phishing messages in the first set of training messages as including phishing; and provide a set of feedback to the LLM including an accuracy level of the output.

Clause 17. The non-transitory computer-readable storage medium of clause 15, wherein the instructions further configure the network appliance to: determine that the interaction score for a first account is above a predetermined threshold; and identify that the first account has received a satisfactory result based on the one or more interactions with the set of variant messages, the satisfactory result indicating that the first account has completed at least one category of phishing training.

Clause 18. The non-transitory computer-readable storage medium of clause 17, wherein the satisfactory result indicates one or more of a completion of train for the first account or an additional category of phishing training to prompt the LLM to generate additional variants of the received messages related to the first account.

Clause 19. The non-transitory computer-readable storage medium of clause 15, wherein the instructions further configure the network appliance to: determine that the interaction score for a first account is below a predetermined threshold; identify that the first account has received a non-satisfactory result based on the one or more interactions with the set of variant messages, the non-satisfactory result indicating that the first account has not completed an assigned category of phishing training; identify at least one of the interactions related to the first account that interacted with a phishing message; provide to the LLM a second request including a second prelabeled dataset of phishing examples related to the phishing message; receive a second output from the LLM identifying additional example emails based on the second prelabeled dataset; and transmit to the first account the additional example emails to retrain the first account.

Clause 20. The non-transitory computer-readable storage medium of clause 15, wherein the prompt to the LLM further comprises: prompting the LLM to create the one or more variants of the received messages that include content characteristics including variant hyperlinks, domain names, and homoglyphic characters, the variant messages being generated based on the prelabeled dataset and configured to mimic the content characteristics observed in known phishing messages and the received messages from the one or more accounts.

What is claimed is:

1. A method comprising:
   training an LLM with a prelabeled dataset of example phishing messages, the LLM being configured to identify one or more phishing messages based on the prelabeled dataset;
   receiving messages from one or more accounts associated with an enterprise;
   providing a message with a prompt to the LLM, the message prompting the LLM to create one or more variants of the received messages that includes similar content characteristics;
   receiving from the LLM a set of variant messages including the content characteristics, the set of variant messages generated to include one or more phishing characteristics identified during training with the prelabeled dataset;
   transmitting the set of variant messages to the accounts to identify one or more interactions with at least one of the set of variant messages; and
   generating an interaction score based on the one or more interactions by the one or more accounts.

2. The method of claim 1, wherein training the LLM comprises:
   providing to the LLM the prelabeled dataset of phishing messages;
   sending a first request to the LLM to identify the one or more phishing messages in a first set of training messages;
   receiving an output from the LLM identifying the one or more phishing messages in the first set of training messages as including phishing; and
   providing a set of feedback to the LLM including an accuracy level of the output.

3. The method of claim 1, further comprising:
   determining that the interaction score for a first account is above a predetermined threshold; and
   identifying that the first account has received a satisfactory result based on the one or more interactions with the set of variant messages, the satisfactory result indicating that the first account has completed at least one category of phishing training.

4. The method of claim 3, wherein the satisfactory result indicates one or more of a completion of training for the first account or an additional category of phishing training to prompt the LLM to generate additional variants of the received messages related to the first account.

5. The method of claim 1, further comprising:
   determining that the interaction score for a first account is below a predetermined threshold;
   identifying that the first account has received a non-satisfactory result based on the one or more interactions with the set of variant messages, the non-satisfactory result indicating that the first account has not completed an assigned category of phishing training;
   identifying at least one of the interactions related to the first account that interacted with a phishing message;
   providing to the LLM a second request including a second prelabeled dataset of phishing examples related to the phishing message;
   receiving a second output from the LLM identifying additional example emails based on the second prelabeled dataset; and
   transmitting to the first account the additional example emails to retrain the first account.

6. The method of claim 1, wherein the prompt to the LLM further comprises:
   prompting the LLM to create the one or more variants of the received messages that include content characteristics including variant hyperlinks, domain names, and homoglyphic characters, the variant messages being generated based on the prelabeled dataset and configured to mimic the content characteristics observed in known phishing messages and the received messages from the one or more accounts.

7. The method of claim 1, wherein the interaction score is generated by:
   collecting the one or more interactions with the set of variant messages by the one or more accounts in a database;
   analyzing the one or more interactions to identify patterns in the interactions associated with known vulnerabilities to phishing attempts; and
   applying a score based on at least one user accounts susceptibility to the known vulnerabilities indicated by the one or more interactions.

8. A network device comprising:
   one or more memories having computer-readable instructions stored therein; and
   one or more processors configured to execute the computer-readable instructions to:
      train an LLM with a prelabeled dataset of example phishing messages, the LLM being configured to identify one or more phishing messages based on the prelabeled dataset;
      receive messages from one or more accounts associated with an enterprise;
      provide a message with a prompt to the LLM, the message prompting the LLM to create one or more variants of the received messages that includes similar content characteristics;
      receive from the LLM a set of variant messages including the content characteristics, the set of variant messages generated to include one or more phishing characteristics identified during training with the prelabeled dataset;
      transmit the set of variant messages to the accounts to identify one or more interactions with at least one of the set of variant messages; and
      generate an interaction score based on the one or more interactions by the one or more accounts.

9. The network device of claim 8, wherein training the LLM comprises:
   providing to the LLM the prelabeled dataset of phishing messages;
   sending a first request to the LLM to identify the one or more phishing messages in a first set of training messages;
   receiving an output from the LLM identifying the one or more phishing messages in the first set of training messages as including phishing; and providing a set of feedback to the LLM including an accuracy level of the output.

10. The network device of claim 8, wherein the instructions further configure the network device to:
   determine that the interaction score for a first account is above a predetermined threshold; and
   identify that the first account has received a satisfactory result based on the one or more interactions with the set of variant messages, the satisfactory result indicating that the first account has completed at least one category of phishing training.

11. The network device of claim 10, wherein the satisfactory result indicates one or more of a completion of train for the first account or an additional category of phishing training to prompt the LLM to generate additional variants of the received messages related to the first account.

12. The network device of claim 8, wherein the instructions further configure the network device to:
   determine that the interaction score for a first account is below a predetermined threshold;
   identify that the first account has received a non-satisfactory result based on the one or more interactions with the set of variant messages, the non-satisfactory result indicating that the first account has not completed an assigned category of phishing training;
   identify at least one of the interactions related to the first account that interacted with a phishing message;
   provide to the LLM a second request including a second prelabeled dataset of phishing examples related to the phishing message;
   receive a second output from the LLM identifying additional example emails based on the second prelabeled dataset; and
   transmit to the first account the additional example emails to retrain the first account.

13. The network device of claim 8, wherein the prompt to the LLM further comprises:
   prompt the LLM to create the one or more variants of the received messages that include content characteristics including variant hyperlinks, domain names, and homoglyphic characters, the variant messages being generated based on the prelabeled dataset and configured to mimic the content characteristics observed in known phishing messages and the received messages from the one or more accounts.

14. The network device of claim 8, wherein the interaction score is generated by:
   collecting the one or more interactions with the set of variant messages by the one or more accounts in a database;
   analyzing the one or more interactions to identify patterns in the interactions associated with known vulnerabilities to phishing attempts; and
   applying a score based on at least one user accounts susceptibility to the known vulnerabilities indicated by the one or more interactions.

15. A non-transitory computer-readable storage medium comprising computer-readable instructions, which when executed by one or more processors of a network appliance, cause the network appliance to:
   train an LLM with a prelabeled dataset of example phishing messages, the LLM being configured to identify one or more phishing messages based on the prelabeled dataset;
   receive messages from one or more accounts associated with an enterprise;
   provide a message with a prompt to the LLM, the message prompting the LLM to create one or more variants of the received messages that includes similar content characteristics;
   receive from the LLM a set of variant messages including the content characteristics, the set of variant messages generated to include one or more phishing characteristics identified during training with the prelabeled dataset;
   transmit the set of variant messages to the accounts to identify one or more interactions with at least one of the set of variant messages; and
   generate an interaction score based on the one or more interactions by the one or more accounts.

16. The non-transitory computer-readable storage medium of claim 15, wherein training the LLM comprises:
   provide to the LLM the prelabeled dataset of phishing messages;
   send a first request to the LLM to identify the one or more phishing messages in a first set of training messages;
   receive an output from the LLM identifying the one or more phishing messages in the first set of training messages as including phishing; and
   provide a set of feedback to the LLM including an accuracy level of the output.

17. The non-transitory computer-readable storage medium of claim 15, wherein the instructions further configure the network appliance to:
   determine that the interaction score for a first account is above a predetermined threshold; and
   identify that the first account has received a satisfactory result based on the one or more interactions with the set of variant messages, the satisfactory result indicating that the first account has completed at least one category of phishing training.

18. The non-transitory computer-readable storage medium of claim 17, wherein the satisfactory result indicates one or more of a completion of train for the first account or an additional category of phishing training to prompt the LLM to generate additional variants of the received messages related to the first account.

19. The non-transitory computer-readable storage medium of claim 15, wherein the instructions further configure the network appliance to:
   determine that the interaction score for a first account is below a predetermined threshold;
   identify that the first account has received a non-satisfactory result based on the one or more interactions with the set of variant messages, the non-satisfactory result indicating that the first account has not completed an assigned category of phishing training;
   identify at least one of the interactions related to the first account that interacted with a phishing message;
   provide to the LLM a second request including a second prelabeled dataset of phishing examples related to the phishing message;
   receive a second output from the LLM identifying additional example emails based on the second prelabeled dataset; and
   transmit to the first account the additional example emails to retrain the first account.

20. The non-transitory computer-readable storage medium of claim 15, wherein the prompt to the LLM further comprises:
   prompting the LLM to create the one or more variants of the received messages that include content characteristics including variant hyperlinks, domain names, and homoglyphic characters, the variant messages being generated based on the prelabeled dataset and configured to mimic the content characteristics observed in known phishing messages and the received messages from the one or more accounts.

* * * * *